May 19, 1942.  A. C. DODSON  2,283,600
FOOT REST
Filed July 20, 1939
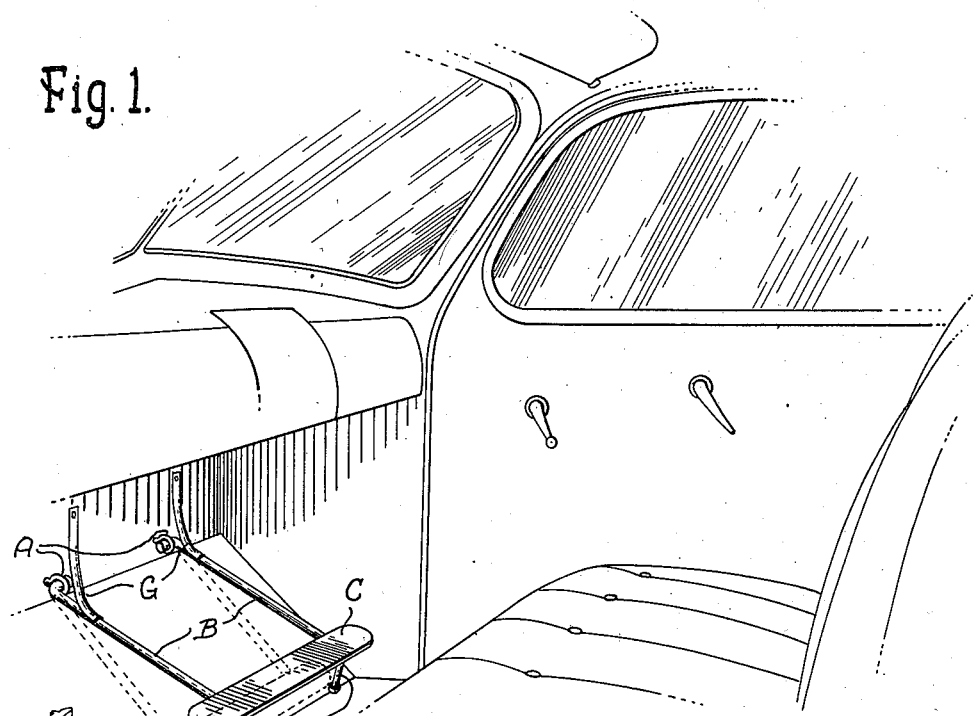
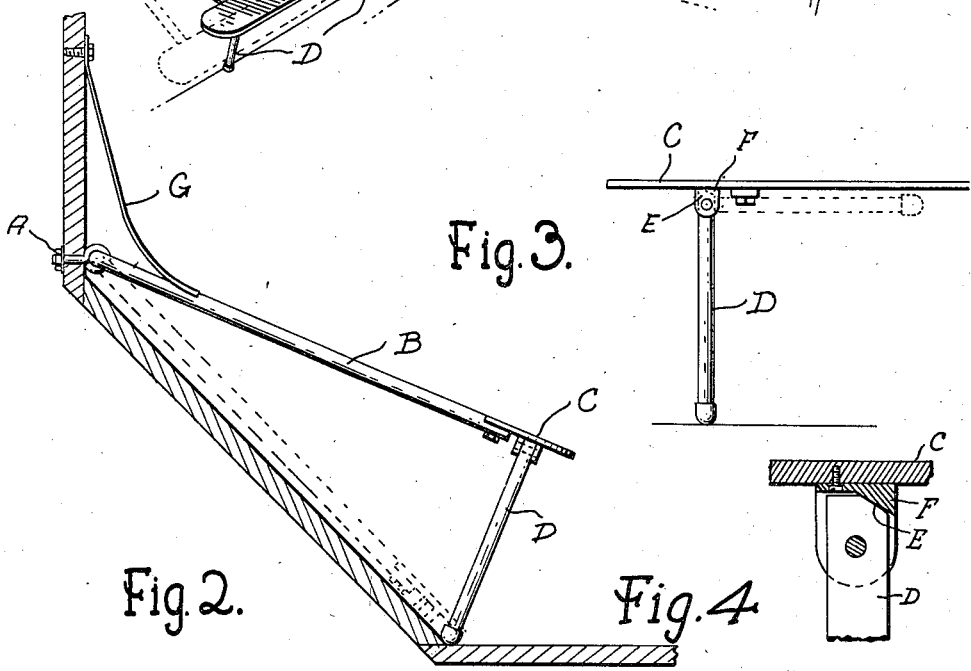
INVENTOR.
Ann C. Dodson
BY
ATTORNEY.

Patented May 19, 1942

2,283,600

UNITED STATES PATENT OFFICE 2,283,600

FOOTREST

Ann C. Dodson, Detroit, Mich.

Application July 20, 1939, Serial No. 285,570

1 Claim. (Cl. 155—165)

This invention relates to an improved foot rest for use on airplanes, passenger cars and similar conveyances.

The difficulty heretofore experienced is that the existing foot rests could not be quickly removed from set up position, when not in use. Moreover, in airplanes the foot rest now in common use frequently slips when its support is most urgently needed. With my improved foot rest this cannot happen, as the foot rest described herewith is either in place on the floor or is held out of the way in an inclined or vertical plane, leaving the floor absolutely clear of all obstructions.

Fig. 1 shows my device applied to the dash adjacent the front seat of an automobile.

Fig. 2 shows a side view of the device shown in Fig. 1.

Fig. 3 shows a detail of the supporting leg of my improved foot rest.

Figure 4 shows an enlarged view of the details of the elements C, D, E, F, of Figure 3.

Description

In the figures:

A—A are the eye bolts from which the arms B—B are pivotally supported. A foot rest C is firmly attached to these arms B—B. Legs D—D can be unfolded from the foot rest C to form a support on the floor of the car or airplane. The upper ends E of the legs D—D have inclined faces so as to engage with the inclined faces of the pieces F bolted to the underside of the foot rest C; hence when the legs D—D are in place, so as to raise the foot rest C, the two inclined faces of the elements E and F engage with each other and by making the angle of the inclined face sufficiently acute the legs D—D are held in place by friction, but are not locked together, so that they can easily be folded into the position shown in broken lines.

The arms B—B may be engaged by springs G—G or similar, equivalent means to press the legs D—D firmly down on to the floor of the car or airplane and also to hold the foot rest firmly against the inclined floor under the dash when not in use. By these means the foot rest will not collapse unexpectedly, just as the stewardess has handed you a cup of chocolate, nor will the foot rest swing up when the airplane strikes an air pocket.

Obviously, a single eye bolt A, a single arm B, held by a single spring G and attached to a foot rest C could be used. Further, a single leg D could be used, but I prefer to use two legs, two arms and two eye bolts.

What I claim is:

A foot rest for use in conjunction with the front passenger seat of an automobile in which there is an inclined floor board associated with a dash board comprising a pair of supports mounted adjacent to the dash board end of said inclined floor, a pair of arms hinged to said supports, a foot rest mounted on the outer end of said arms, a pair of movable legs hinged to said foot rest on an axis at right angles to the first mentioned hinges and adapted to be folded under said foot rest and to be unfolded so as to serve as two supporting legs for said foot rest, spring means adapted to bear down on said foot rest to hold said legs when unfolded firmly against the floor to prevent rattling.

ANN C. DODSON.